(No Model.)
F. AARON & J. R. G. HUFFMAN.
WRENCH.
No. 603,494.　　　　　　　　　　Patented May 3, 1898.
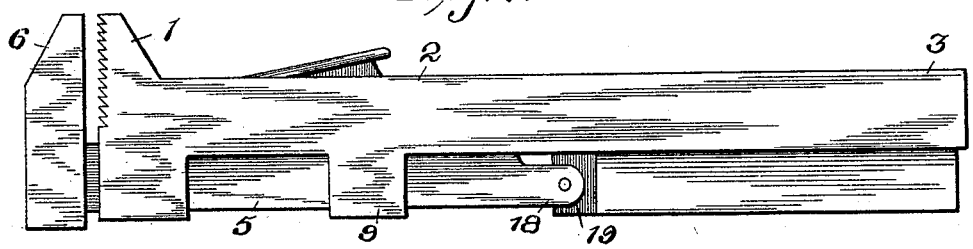
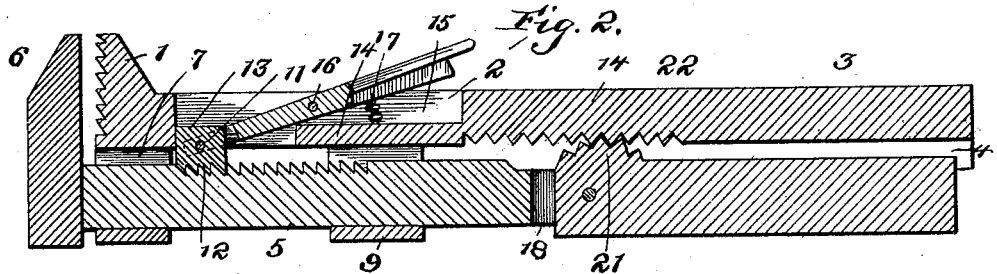
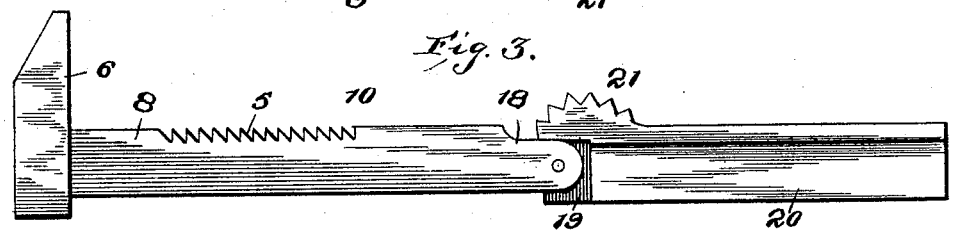
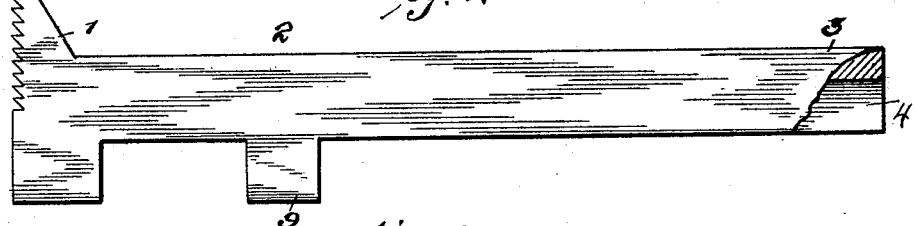
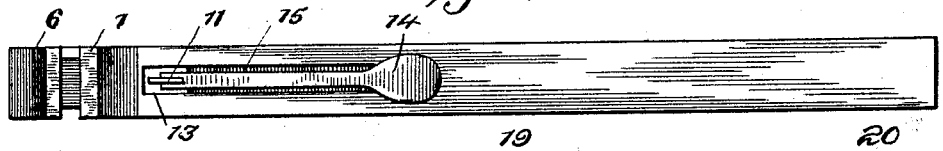
Witnesses　　　　　　　　　　Inventors
　　　　　　　　　　　　　　JAMES R. G. HUFFMAN
　　　　　　　　　　　　　　FRANK AARON
　　　　　　　　　　　　By
　　　　　　　　　　　　　　Attorney

UNITED STATES PATENT OFFICE.

FRANK AARON AND JAMES R. G. HUFFMAN, OF LANSING, KANSAS.

WRENCH.

SPECIFICATION forming part of Letters Patent No. 603,494, dated May 3, 1898.

Application filed September 22, 1897. Serial No. 652,564. (No model.)

*To all whom it may concern:*

Be it known that we, FRANK AARON and JAMES R. G. HUFFMAN, citizens of the United States, residing at Lansing, in the county of Leavenworth and State of Kansas, have invented certain new and useful Improvements in Wrenches; and we do hereby declare the following to be a full, clear, and exact description of the invention, such as will enable others skilled in the art to which it appertains to make and use the same.

This invention relates to a novel wrench, and has for its object the production of a device of this general character which may be readily adjusted to rotary elements to be operated upon—as, for instance, nuts, bolt-heads, or the like—quickly and in a manner to prevent the accidental movement of the jaws, which would tend to loosen the hold upon the part.

To the accomplishment of this object the invention consists in certain novel features of construction and arrangement of parts, which will hereinafter be fully described, and succinctly defined in the appended claims.

Referring to the drawings, Figure 1 is a general view of our wrench. Fig. 2 is a central longitudinal section showing the dog in engagement with the shank and the locking-handle in engagement with the handle of the fixed jaw. Fig. 3 is a detail view of the movable jaw, its shank, and the locking-handle detached. Fig. 4 is a similar view of the fixed jaw and its handle, with the movable jaw and its connected parts removed; and Figs. 5 and 6 are edge views of the opposite edges of the wrench complete.

Referring to the numerals on the drawings, 1 indicates the fixed jaw of our wrench, from which extends, as usual, an elongated shank 2, terminating in a handle 3, the rear edge or face of the shank being hollowed out, as indicated at 4, for the reception of the movable shank 5 of a movable jaw 6, which latter is located above the fixed jaw 1. The shank 5 extends downwardly through a rectangular opening 7 in the head 1, and its front face 8 lies within the longitudinal recess or hollowed-out portion of the fixed shank and handle, a bearing-strap 9 being preferably provided upon the shank 2 below the head, designed to properly guide the movable shank in its longitudinal movement. The face 8 of the shank 5 is provided, as shown, with a series of ratchet-teeth 10, having their upper edges or sides horizontal and their lower faces inclined, these teeth being designed to be engaged by a movable dog 11, provided with oppositely-disposed ratchet-teeth 12 and movable within a transverse aperture 13 in the shank 2, immediately below the head 1, and designed to be retracted by a dog-actuating lever 14, pivotally mounted within an elongated recess 15 in the outer edge of the shank 2, opposite the recess 4, and pivotally connected at its forward end, as indicated, to the dog 11, a spring 17 being provided between the free end of the lever 14 and the bottom of the recess 15 to normally urge the lower or handle end of the lever outwardly and to cause the teeth of the dog 11 to normally engage the teeth 10 upon the movable shank 5. By this means it will be seen that the movable head may be adjusted toward the fixed head, but that its movement in the opposite direction will be prevented by the engagement of the dog with the movable shank, and upward or outward movement of the movable head will necessitate the depression of the lever 14 and the retraction of the dog. By this means the jaws are retained in their adjusted positions, and their accidental or casual separation, when the wrench is subjected to a severe strain, is prevented.

We shall now proceed to describe, however, a locking-handle which may be actuated to securely lock the movable jaw against movement in any direction and which, when actuated after the movable jaw has been approximately adjusted, will urge the jaws into positive contact with the elements to be operated upon and will thereafter preclude the possibility of accidental dislocation of the parts independently of the dog 12.

18 indicates a pair of bearing lugs or ears extending from the lower end of the shank 5, and between which is pivoted the bearing-lug 19, extending from the upper end of a pivoted locking-handle 20. This handle is of a width corresponding to the width of the handle 3, but is notched along its inner corners to permit its inner face to extend into the recess 4. The handle is provided adjacent to the pivot with an eccentrically-located toothed locking-face 21, the teeth of which are designed to engage a series of teeth 22, formed at the bottom of the recess 4 in the shank 2 and disposed oppositely to the teeth 10 upon the shank 5. By this arrangement the locking-handle when it is turned down against the handle 3 causes the teeth upon the locking-faces to engage the teeth at the bottom of the recess 4, and by reason of the eccentric location of the locking-face and shank 5 its head will not only be locked securely in place, but will be urged slightly to cause the movable jaw to clamp the nut or other element securely, and the locking-handle will be retained in close contact with the handle 3.

It will thus be observed that we have produced a simple, durable, and efficient wrench, the movable jaw of which may be readily adjusted and is clamped firmly against the object to be operated upon in a manner to prevent its accidental and casual displacement.

While the present embodiment of our invention appears at this time to be preferable, we do not desire to limit ourselves to the structural details illustrated and described, but reserve the right to change, modify, or vary them at will within the scope of our invention.

Having thus described the invention, what is claimed as new, and desired to be secured by Letters Patent, is—

1. A wrench consisting of the member carrying one jaw and having teeth upon its upper side, the member carrying the other jaw and having a lever secured in the body portion thereof, and carrying a toothed portion to engage the teeth on the other member to hold the jaws in a more rigid position, and a locking-lever pivotally secured to the handle end of the first-mentioned member adapted to engage teeth on the lower side of the last-mentioned member to rigidly hold the jaws of the wrench in place.

2. In a wrench, the combination with a fixed jaw, its shank and handle, of a toothed dog carried by the shank, and a pivoted dog-actuating lever, a movable jaw, a shank extending therefrom provided with a series of teeth designed to coöperate with the dog, and a pivoted locking-handle upon the lower extremity of the movable shank and provided with an eccentric toothed face designed to coöperate with teeth upon the fixed shank, said teeth being disposed oppositely upon the movable shank, substantially as specified.

3. The combination with a fixed head, of a shank, and handle extending therefrom and provided with a longitudinal recess, of a fixed jaw, a shank extending therefrom and movable within the recess in the fixed shank, oppositely-disposed teeth upon the contiguous faces of the two shanks but out of coincidence, a toothed dog movable within a recess in the fixed shank and designed to engage the teeth upon the movable shank, a dog-actuating lever pivotally connected to the dog, and a pivoted locking-handle at the lower extremity of the movable shank provided with an eccentric toothed locking-face designed to engage the teeth upon the fixed shank, substantially as specified.

In testimony whereof we have signed this specification in the presence of two subscribing witnesses.

FRANK AARON.
JAMES R. G. HUFFMAN.

Witnesses:
H. V. REILLY,
G. R. BLEAKLEY.